UNITED STATES PATENT OFFICE.

WILLIAM K. LEONARD, OF PIQUA, OHIO.

PROCESS OF PRODUCING RUBBER SUBSTITUTES AND COMPOSITIONS OF MATTER THEREFOR.

SPECIFICATION forming part of Letters Patent No. 615,863, dated December 13, 1898.

Application filed May 16, 1898. Serial No. 680,856. (No specimens.)

*To all whom it may concern:*

Be it known that I, WILLIAM K. LEONARD, a citizen of the United States, residing at Piqua, in the county of Miami and State of Ohio, have invented a certain new and useful Improvement in Processes of Producing Rubber Substitutes and in Compositions of Matter Therefor, of which the following is a full, clear, and exact description.

My invention relates to the subject of rubber substitutes—that is, an article which may be mixed and amalgamated with pure rubber to produce a substance possessing the qualities of india-rubber and other advantages resulting from the mixture of the substitute with pure rubber for manufacture into rubber goods of the market. The use of these rubber substitutes is twofold—first, economy, as the mixture known as "rubber substitute" is very much cheaper than pure rubber, and, second, it produces qualities in the rubber goods manufactured which they would not possess if they were made of pure rubber, and it therefore has a double advantage. Rubber substitutes have been made by various processes more or less satisfactory and varying in cost.

By my process I produce in a simple and very economical manner a substitute superior in the qualities desired to any other known in the market.

The process is as follows: I mix in a heating-pot a quantity of corn-oil, which is an oil produced from the common Indian corn and is an article of commerce, with sulfur. In practice I have preferred and found satisfactory results by using what is known as the "flowers of sulfur," and with these two ingredients a small quantity of paraffin-wax. The proportions are substantially as follows: seventy-six per cent. of the corn-oil, twenty-one per cent. of sulfur, and three per cent. of paraffin-wax. These proportions have produced the best results, though they may be slightly varied without material effect. The heat being applied, the sulfur melts, as does also the paraffin, forming a liquid mass, which must be kept constantly stirred, so that the mixture may be homogeneous throughout. The sulfur and paraffin need not be put in in the start, but may be dropped in as the oil becomes heated, but should be in before the oil reaches 300° Fahrenheit. After the temperature has reached a certain point, usually about 310°, though varying under different circumstances and conditions from that, the chemical reaction begins to take place. When this reaction has been fairly started, the mass is removed from the fire. This chemical reaction continues for some little time, usually about half an hour or longer when the mass is large, this period varying according to the quantity being operated upon and is somewhat affected by the quality or peculiarities of the particular oil being used. The smaller the mass the sooner the reaction is completed. As this chemical reaction or vulcanization goes on, although the fire has been shut off, the temperature usually continues to rise, sometimes as high as 340° or more. The mass is allowed to stand for twelve to twenty-four hours, or, in other words, until it is thoroughly cooled. I then have a solid substance very much resembling crude india-rubber and possessing many of its qualities. It has the resiliency of rubber, but not its tenacity or toughness. It can be cut into pieces for shipment and is ready for use and may be used as rubber substitutes are used usually by grinding and mixing with pure rubber in the usual way known to the art.

I have found in practice that the small quantity of paraffin-wax used is better adapted to produce the desired result than any other like substance, though a substantially equally good result may be obtained by equivalent forms of wax, and I do not limit myself to the use of paraffin alone for this purpose, the object being to prevent the mass from becoming sticky and impractical to handle. With paraffin or equivalent substances used for that purpose the rubber substitute will not stick to the rolls when it is being ground or worked in practice.

I have described my process with the use or application of heat, and while I have discovered that corn-oil may be vulcanized by mixture with sulfur, in producing this particular substitute I prefer to use artificial heat in substantially the manner described.

Having thus described my invention, what I claim, and desire to secure by Letters Patent, is—

1. A composition of matter to be used as a rubber substitute consisting of corn-oil, sulfur and paraffin, in the proportions substantially as and for the purpose described.

2. The above-described process of producing a rubber substitute by mixing corn-oil, sulfur, and paraffin, in the proportions substantially of seventy-six per cent. of corn-oil, twenty-one per cent. of sulfur, and three per cent. of paraffin, subjecting the mass to heat until the oil is valcanized or the process of vulcanization begins, then shutting off the heat and allowing the process of vulcanization to continue until complete and the mass to cool, substantially as and in the manner described.

WILLIAM K. LEONARD.

Witnesses:
 ARTHUR STEM,
 GEORGE HEIDMAN.